May 5, 1942.  C. F. KRAMER  2,281,586
COMBINED SCUFF PLATE AND WEATHER STRIP
Filed Oct. 28, 1940

INVENTOR.
Clarence F. Kramer
BY Colvin C. McRae
ATTORNEY

Patented May 5, 1942

2,281,586

UNITED STATES PATENT OFFICE 2,281,586

COMBINED SCUFF PLATE AND WEATHER STRIP

Clarence F. Kramer, Birmingham, Mich., assignor to Ford Motor Company, Dearborn, Mich., a corporation of Delaware Application October 28, 1940, Serial No. 363,136

5 Claims. (Cl. 296—1)

The object of my invention is to provide a combined scuff plate and weather strip especially adapted for use in connection with motor vehicles.

A further object of my invention is to provide a combined weather strip and scuff plate which is especially suitable for use at the sill of a motor-vehicle door opening to protect the edge of the floor carpet and to form an airtight seal between the door and the door sill. Heretofore, weather strips have been provided around vehicle door openings but, due to the variations unavoidable in the manufacture of automobiles, these strips have usually formed a serious impediment to the closing of such doors, thereby requiring the doors to be slammed to secure their closure. If the strip were so placed that no impediment was offered, then in many of the cars the weather strips did not form airtight seals. With my improved construction the weather strip may be conveniently adjusted to the particular car upon which it is being installed, to thereby form a minimum restriction to the closing of the door and still insure an airtight seal on the particular car on which it is used.

A further object of my invention is to provide a rubber weather strip which may be conveniently snapped into a retaining channel and which strip will have sufficient rigidity to retain itself in position in the channel. The important feature of this construction is that a relatively soft sponge-rubber sealing strip is secured to the stiffer rubber backing member, the soft sealing strip coacting with the door to form the seal therebetween and the stiffer backing member resiliently holding the strip in position.

Still a further object of my invention is to provide a device of the class described in which the scuff-plate portion may be readily adjustable to suit the variations in the door clearance while the scuff-plate portion is retained in a fixed position so as to adequately hold the floor carpet in place, irrespective of the position of adjustment of the weather strip.

With these and other objects in view, my invention consists in the arrangement, construction and combination of the various parts of my improved construction, as described in this specification, claimed in my claims, and illustrated in the accompanying drawing, in which:

Figure 1:
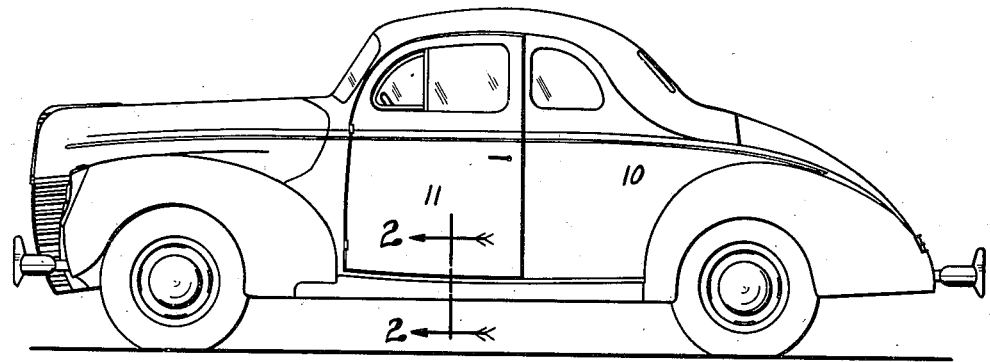
Figure 1 is a side elevation of a motor vehicle having my improved scuff-plate and weather-strip construction installed thereon.

Referring to the accompanying drawing, I have used the reference numeral 10 to indicate the body of a motor vehicle having a door 11 pivotally mounted to swing outwardly from a door opening in the conventional manner. The body 10 is provided with a sill 12 over which a sheet-metal floor 13 is secured.

Figures 2, 3:
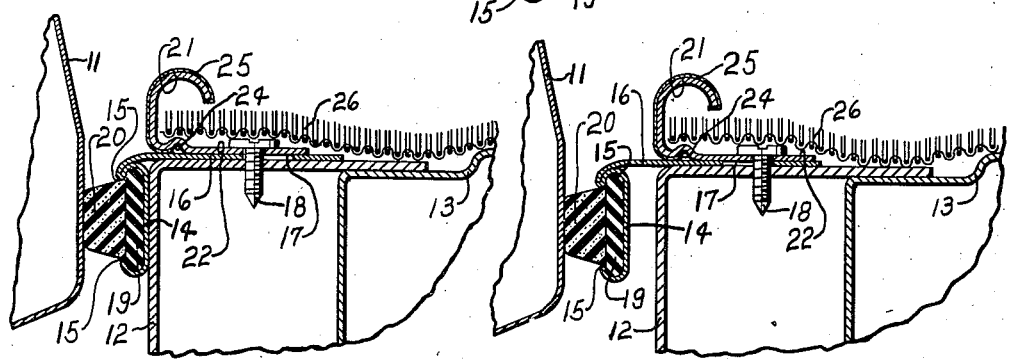
Figure 2 is a sectional view, taken upon the line 2—2 of Figure 1, showing the weather strip in its innermost adjusted position.
Figure 3 is a sectional view, also taken upon the line 2—2 of Figure 1, showing the weather strip in its outermost adjusted position, Figures 2 and 3 illustrating the range of weather-strip adjustment permissible with this construction.

It will be noted from Figures 2 and 3 that when the door 11 is in its closed position the inside wall thereof is spaced a considerable distance from the side of the sill 12. This is necessary to prevent rattles and squeaks due to the weaving of the body and frame during the normal operation of the car. It will also be noted that the clearance between the door 11 and the sill 12 in Figure 2 is considerably less than that illustrated in Figure 3. The two relative positions shown the extreme positions corresponding to the maximum permissible variations in manufacture of the body. The door, as illustrated in Figure 2, closes approximately a quarter of an inch closer to the sill than the door shown in Figure 3.

In order to form a weathertight joint between the door and the door sill in each of these cases, it is necessary to provide an adjustable weather strip against which the door may close to form the seal. If the weather strip were made thick enough to fill the space between the door and the sill member 12 when the parts are aligned, as shown in Figure 3, and this same weather strip were used when the parts were aligned, as shown in Figure 2, then in the latter installation the weather strip would offer a serious impediment to the closing of the door. It is the purpose of this invention to provide a weather strip which may be adjustable laterally to fit the particular alignment between the door and the door sill and thus offer a minimum of restriction to the closing of the door, while maintaining an airtight seal between the door and the body.

In order to accomplish this I have provided a weather-strip support comprising a channel-shaped strip 14 having the flanges thereof turned inwardly to form retaining grooves 15 at each edge thereof. The material of the strip which forms the upper groove 15 is bent backwardly upon itself and extends at right angles from the back of the channel to form a retaining flange 16. The flange 16 has a plurality of elongated openings 17 punched therein through which retaining screws 18 extend to fasten the flange 16 upon the upper face of the sill member 12.

Figures 4, 5:
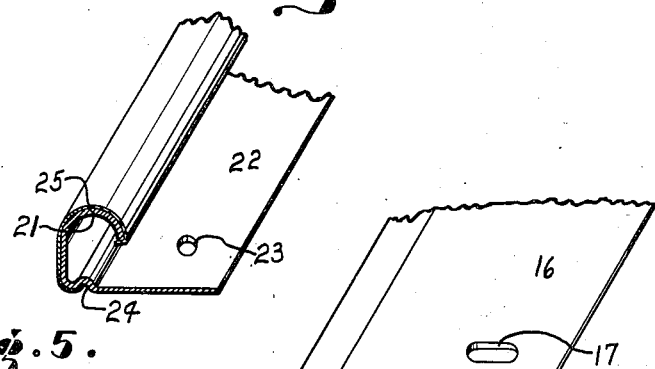
Figure 4 is a sectional view in perspective of the weather-strip member and its retaining channel.
Figure 5 is a sectional view in perspective of of the scuff-plate member.

The weather strip proper consists of a relatively dense rubber backing strip 19 of such width that when pressed into the channel 14 its edges will snap into the grooves 15 to thereby retain the strip in position within the channel. A sponge-rubber weather strip of triangular cross section has its base portion vulcanized to one side of the backing strip 19 and projects outwardly between the channel flanges, as shown in Figure 4. This portion is the bumper part of the weather strip. The apex of the sponge rubber strip 20 coacts with the door in its closed position and is readily distorted thereby to form a trapezoidal section, as shown in Figures 2 and 3. The sponge rubber section so distorted offers very little impediment to the closing of the door.

If the entire weather-strip member were made of sponge rubber, then it would not have sufficient rigidity to hold itself in place within the grooves 15 and, if the weather strip were entirely made of rubber of the density required to hold itself in the channel 14, then the deformation of the rubber to the section shown in Figures 2 and 3 would seriously restrict the closing of the door. By making this weather strip as a composite member, the strip is adequately retained in position and still may be easily deformed to provide a weathertight seal with a minimum of restriction.

The scuff-plate portion of my improved construction comprises a sheet-metal strip having a bead 21 formed along one edge, the rest of the strip forming a flat retaining flange 22. A plurality of openings 23 are formed in the flange 22, these openings being spaced so that the weather-strip retaining screws 18 may enter therethrough and also retain the scuff plate in position. It will be noted that a groove 24 is rolled in the strip at the intersection of the bead 21 and flange 22 and a garnish moulding 25 of arcuate section is snapped over the bead 21, one edge of which enters into the groove 24 and the other edge snaps over the free edge of the bead 21.

The purpose of the scuff plate is to prevent the carpet used in the vehicle from being scuffed or kicked up around the door opening, due to passengers getting in and leaving the car. The carpet used in this vehicle is given the reference numeral 26 and is cut to a templet so that variations in the dimensions thereof are very slight. The scuff plate must be mounted so that the edge of the carpet 26 extends into the bead 21 and it is therefore imperative that the scuff plate be secured in a fixed position irrespective of the adjusted position of the weather strip. It is for this reason that no provision for a lateral adjustment is made in securing the scuff-plate flange 22.

In assembling this device, the weather-strip flange 16 is first laid on top of the sill member 12 and then the scuff-plate flange 22 is placed on top of the weather-strip flange 16. The screws 18 are then inserted in the sill member 12. The door of the car is then closed and the weather strip pushed outwardly until the sponge-rubber portion thereof is flattened to the shape shown in Figures 2 and 3. The screws 18 are then tightened so that they retain both the scuff plate and the weather strip to the sill 12. The carpet 26 is then installed with its lateral edges beneath the bead 21 to complete the installation.

Among the many advantages arising from the use of my improved construction, the most important is probably the improved seal obtained by the composite weather-strip arrangement.

Another advantage of this construction is that the weather strip may be readily adjustable for variations in the closed position of the door.

Some changes may be made in the arrangement, construction and combination of the various parts of my improved construction without departing from the spirit of my invention, and it is my intention to cover by my claims such changes as may reasonably be included within the scope thereof.

I claim as my invention:

1. A combined scuff plate and weather strip adapted to protect the edge of a motor-vehicle carpet and form a seal between the vehicle door sill and a door therein comprising, a scuff-plate member formed from sheet metal having a bead along one edge of a semicircular cross section, with a supporting flange extending therefrom which is secured to the outer edge of said door sill and with the vehicle carpet extending into said bead portion, a channel-shaped weather strip support having a retaining flange extending transversely from its rear face, said retaining flange having openings therein, and said retaining flange being disposed between said supporting flange and said door sill, retaining screws extending through both of said flanges into said sill, a composite weather strip having a base portion disposed in said channel, said base portion being formed of resilient material of sufficient width and hardness that it is retained in said channel by its own resiliency, and a sponge-rubber bumper strip secured to the outer face of said base portion between the arms of said channel, which bumper portion is compressed by said door when the door is closed.

2. A combined scuff plate and weather strip adapted to protect the edge of a motor-vehicle carpet and form a seal between a vehicle body sill and a door therein comprising, a scuff-plate portion formed of a strip of sheet metal, one edge of which is rolled to a bead section to receive the edge of said carpet and the other edge of which extends therefrom to form a supporting flange, a channel-shaped weather strip support having a retaining flange extending transversely from its rear face, said weather-strip retaining flange being secured between said door sill and said scuff-plate supporting flange by a plurality of screws which extends through said flanges into said door sill, and a composite weather strip having a base portion disposed in said channel, said base portion being formed of rubber of sufficient width and hardness that it is retained in said channel by its own resiliency, and a triangular-shaped sponge rubber bumper portion secured to the outer face of said base portion between the arms of said channel, said bumper portion being compressed by said door when the door is closed.

3. A combined scuff plate and weather strip adapted to protect the edge of a motor vehicle carpet and form a seal between a vehicle body still and a door therein, comprising, a scuff plate portion comprising a bead section and a supporting flange, a weather strip support having a channel section and a retaining flange, a weather strip in said weather strip support, and means for securing said weather strip support and said scuff plate portion to said sill, said means including an adjustable connection whereby the position of said weather strip support may be adjusted relative to the position of said support and said scuff plate.

4. A combined scuff plate and weather strip adapted to protect the edge of a motor vehicle carpet and form a seal between a vehicle door sill and the door therein, comprising, a scuff plate member formed of sheet metal having a bead along one edge of a semicircular cross section, with a retaining flange extending therefrom, with the vehicle carpet extending into said bead portion, a channel-shaped weather strip support having a retaining flange extending transversely from its base, said retaining flanges having openings therein, and said support retaining flange being disposed between said scuff plate retaining flange and said door sill, retaining screws extending through both of said flanges into said sill, a weather strip in said weather strip support, and means including a slot in said weather strip support whereby the position of said weather strip support may be adjusted independently of said scuff plate member.

5. A combined scuff plate and weather strip adapted to protect the edge of a motor vehicle carpet and form a seal between the vehicle door sill and the door therein, comprising, a scuff plate member formed of sheet metal having a bead along one edge, with a supporting flange extending therefrom and with the vehicle carpet extending into said bead portion, a weather strip support having a portion adapted to receive a weather strip and having a retaining flange extending from said receiving portion, a weather strip in said receiving portion, a plurality of openings in said scuff plate, a plurality of slots in said weather strip support aligned therewith, and retaining screws in said co-operating slots and hole whereby the position of said weather strip support may be adjusted with respect to said door sill and said scuff plate, the relation of said scuff plate to said door sill remaining fixed throughout.

CLARENCE F. KRAMER.